United States Patent
Wang et al.

(10) Patent No.: US 12,119,484 B2
(45) Date of Patent: Oct. 15, 2024

(54) LITHIUM-CONTAINING COATINGS FOR CATHODE MATERIALS

(71) Applicant: GM GLOBAL TECHNOLOGY OPERATIONS LLC, Detroit, MI (US)

(72) Inventors: Biqiong Wang, Madison Heights, MI (US); Meinan He, Sterling Heights, MI (US); Anne M. Dailly, West Bloomfield, MI (US); Matthew Beckner, Peoria, IL (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 312 days.

(21) Appl. No.: 17/548,031

(22) Filed: Dec. 10, 2021

(65) Prior Publication Data

US 2023/0187612 A1 Jun. 15, 2023

(51) Int. Cl.
  H01M 4/36 (2006.01)
  H01M 4/04 (2006.01)
  (Continued)

(52) U.S. Cl.
  CPC ......... H01M 4/366 (2013.01); H01M 4/0428 (2013.01); H01M 4/131 (2013.01);
  (Continued)

(58) Field of Classification Search
  CPC .... H01M 4/366; H01M 4/0428; H01M 4/131; H01M 4/505; H01M 4/525; H01M 4/62;
  (Continued)

(56) References Cited

U.S. PATENT DOCUMENTS

| 8,974,946 B2 | 3/2015 | Cai et al. |
| 9,123,939 B2 | 9/2015 | Xiao et al. |

(Continued)

FOREIGN PATENT DOCUMENTS

| CN | 116314780 A | 6/2023 |
| DE | 102022124629 A1 | 6/2023 |

(Continued)

*Primary Examiner* — James M Erwin
*Assistant Examiner* — John S Medley
(74) *Attorney, Agent, or Firm* — Harness, Dickey & Pierce, P.L.C.

(57) ABSTRACT

A positive electrode including a plurality of electroactive particles defining an electroactive layer is provided. A first lithium-containing coating is disposed on one or more surfaces of the electroactive layer. The first lithium-containing coating covers between about 30% and about 50% of a total exposed surface area of the electroactive layer. A second lithium-containing coating encompasses at least one electroactive particle of the plurality of electroactive particles. The second lithium-containing coating covers between about 95% and about 100% of the at least one electroactive particle. The first and second lithium-containing coatings each have a thickness between about 0.2 nm and about 5 nm. The positive electrode further includes an electrolyte additive that aids in the formation of a first passivation layer on exposed surfaces of the first lithium-containing coating, and a second passivation layer on exposed surfaces of the second lithium-containing coating.

17 Claims, 16 Drawing Sheets

(51) Int. Cl.
  *H01M 4/131* (2010.01)
  *H01M 4/505* (2010.01)
  *H01M 4/525* (2010.01)
  *H01M 4/62* (2006.01)
  *H01M 10/0525* (2010.01)
  *H01M 10/0567* (2010.01)
  *H01M 4/02* (2006.01)

(52) U.S. Cl.
  CPC .......... *H01M 4/505* (2013.01); *H01M 4/525* (2013.01); *H01M 4/62* (2013.01); *H01M 10/0525* (2013.01); *H01M 10/0567* (2013.01); *H01M 2004/021* (2013.01); *H01M 2004/028* (2013.01)

(58) Field of Classification Search
  CPC ......... H01M 10/0525; H01M 10/0567; H01M 2004/021; H01M 2004/028
  USPC ....................................................... 429/213
  See application file for complete search history.

(56) References Cited

U.S. PATENT DOCUMENTS

| | | | |
|---|---|---|---|
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |
| 9,742,028 B2 | 8/2017 | Zhou et al. | |
| 9,896,763 B2 | 2/2018 | Dadheech et al. | |
| 9,905,847 B2 | 2/2018 | Dadheech et al. | |
| 9,923,189 B2 | 3/2018 | Xiao | |
| 9,929,435 B2 | 3/2018 | Cai et al. | |
| 9,979,008 B2 | 5/2018 | Dai et al. | |
| 9,985,284 B2 | 5/2018 | Dadheech et al. | |
| 10,084,204 B2 | 9/2018 | Dai et al. | |
| 10,128,481 B2 | 11/2018 | Xiao et al. | |
| 10,141,559 B2 | 11/2018 | Xiao et al. | |
| 10,199,643 B2 | 2/2019 | Zhou et al. | |
| 10,312,501 B2 | 6/2019 | Yang et al. | |
| 10,326,166 B2 | 6/2019 | Yang et al. | |
| 10,381,170 B2 | 8/2019 | Dai et al. | |
| 10,396,360 B2 | 8/2019 | Xiao et al. | |
| 10,573,879 B2 | 2/2020 | Yang et al. | |
| 10,622,627 B2 | 4/2020 | Dadheech et al. | |
| 10,629,941 B2 | 4/2020 | Dai et al. | |
| 10,680,281 B2 | 6/2020 | Yersak et al. | |
| 10,991,946 B2 | 4/2021 | Xiao et al. | |
| 11,094,996 B2 | 8/2021 | Xiao et al. | |
| 11,101,501 B2 | 8/2021 | Liu et al. | |
| 2011/0195315 A1* | 8/2011 | Tsuchida | H01M 4/13 429/304 |
| 2014/0265557 A1 | 9/2014 | Huang et al. | |
| 2015/0056493 A1 | 2/2015 | Dadheech et al. | |
| 2015/0056507 A1 | 2/2015 | Dadheech et al. | |
| 2015/0104690 A1 | 4/2015 | Xiao et al. | |
| 2015/0162583 A1 | 6/2015 | Dadheech et al. | |
| 2015/0349307 A1 | 12/2015 | Dadheech et al. | |
| 2016/0149220 A1* | 5/2016 | Uhm | H01M 4/131 429/223 |
| 2016/0172706 A1 | 6/2016 | Xiao et al. | |
| 2016/0254546 A1* | 9/2016 | Kwak | H01M 4/628 429/223 |
| 2016/0301104 A1* | 10/2016 | Shi | H01M 4/505 |
| 2017/0271678 A1 | 9/2017 | Yang et al. | |
| 2019/0326070 A1 | 10/2019 | Dai et al. | |
| 2019/0372155 A1 | 12/2019 | Yersak et al. | |
| 2019/0393549 A1 | 12/2019 | Yersak et al. | |
| 2020/0127282 A1 | 4/2020 | Yersak et al. | |
| 2020/0152976 A1* | 5/2020 | Cui | C23C 16/45553 |
| 2020/0259208 A1* | 8/2020 | Yamamoto | H01M 4/131 |
| 2020/0388886 A1* | 12/2020 | Yokoyama | H01M 4/364 |
| 2020/0395630 A1 | 12/2020 | Yersak et al. | |
| 2021/0135230 A1 | 5/2021 | Xu et al. | |
| 2021/0202987 A1* | 7/2021 | Yoshida | H01M 4/366 |
| 2022/0013774 A1* | 1/2022 | Shin | H01M 4/483 |
| 2022/0013789 A1* | 1/2022 | Matsuta | H01M 4/13 |
| 2022/0173393 A1* | 6/2022 | Aoyagi | H01M 4/525 |

FOREIGN PATENT DOCUMENTS

| | | | |
|---|---|---|---|
| JP | 2015072772 A * | 4/2015 | ............ C01B 25/45 |
| WO | 2017045573 A1 | 3/2017 | |

* cited by examiner

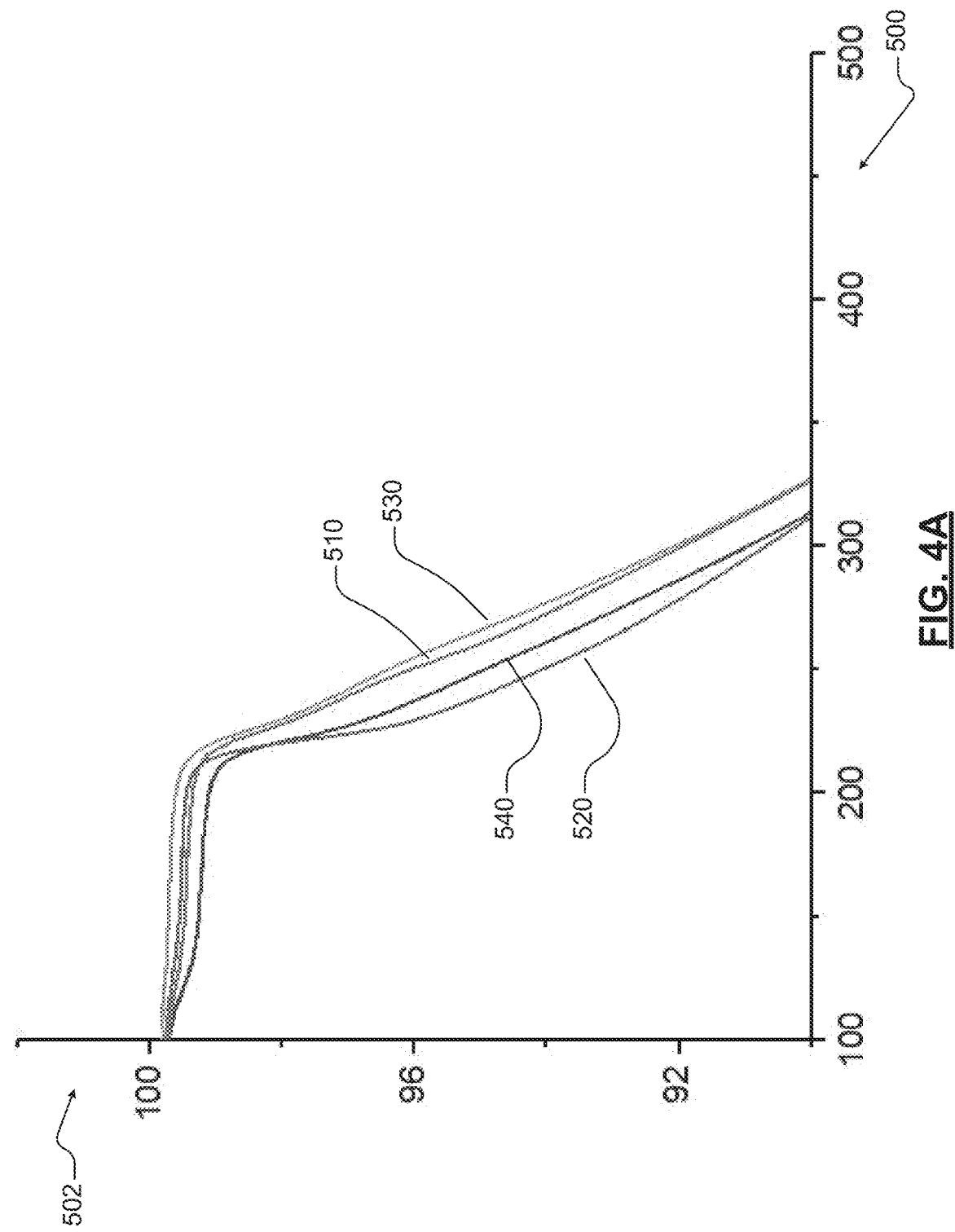

LITHIUM-CONTAINING COATINGS FOR CATHODE MATERIALS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

In various aspects, positive electrodes may include nickel-rich electroactive materials. Such materials, however, are often susceptible to material loss resulting from reactions with the electrolyte and/or the negative electroactive materials, in particular lithium metal anodes. These reactions are often exothermic and negatively commonly impact the thermostability and longevity of battery cells. It would be desirable to develop improved electrodes and electroactive materials, and methods of using the same, that can address these challenges.

SUMMARY

This section provides a general summary of the disclosure, and is not a comprehensive disclosure of its full scope or all of its features.

The present disclosure relates to positive electrode or cathode materials, in particular, lithium-containing coatings and electrolyte additives, and methods of making and using the same.

In various aspects, the present disclosure provides a positive electrode that includes a positive electroactive material defining an electroactive material layer, and a lithium-containing coating disposed on one or more surfaces of the electroactive material layer. The lithium-containing coating may have a thickness greater than or equal to about 0.2 nm to less than or equal to about 5 nm, and an ionic conductivity greater than or equal to about $10^{-7}$ S/cm to less than or equal to about $10^{-3}$ S/cm.

In one aspect, the positive electroactive material may be selected from the group consisting of: NCM 111, NCM 532, NCM 622, NCM 712, NCM 811, NCMA, NCA, LNMO, and combinations thereof.

In one aspect, the lithium-containing coating may include a lithium-containing material selected from the group consisting of: lithium phosphates, lithium alumina, lithium niobates, lithium silicates, lithium alumina fluoride, lithium fluoride, lithium phosphorus oxynitride (LiPON), and combinations thereof.

In one aspect, the lithium-containing coating may cover greater than or equal to about 30% to less than or equal to about 50% of a total surface area of the electroactive material layer.

In one aspect, the positive electrode may further include greater than 0 wt. % to less than or equal to about 1 wt. % of an electrolyte additive. The electrolyte additive may be represented by $Li[B((OCH_2)_xCF_3)_4]$, where $1 \le x \le 6$.

In one aspect, the electrolyte additive may include:

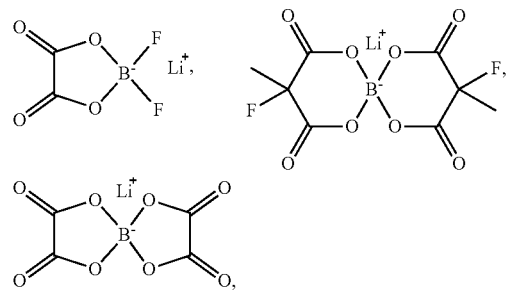

and combinations thereof.

In one aspect, the positive electrode may further include a passivation layer defined by the electrolyte additive on one or more exposed surfaces of the lithium-containing coating. The passivation layer may have a thickness greater than or equal to about 0.2 nm to less than or equal to about 5 nm. The passivation layer may cover greater than or equal to about 0.1% to less than or equal to about 50% of a total exposed surface area of the lithium-containing coating.

In one aspect, the lithium-containing coating may be prepared using one of an atomic layer deposition (ALD) process or a plasma enhanced atomic layer deposition (PEALD) process, where a coating precursor includes one or more binary or ternary compounds, one or more lithium-source precursors, and one or more oxidizers.

In one aspect, the one or more binary or ternary compounds may be selected from the group consisting of: lithium phosphates, lithium alumina, lithium niobates, lithium silicates, lithium alumina fluoride, lithium fluoride, lithium phosphorus oxynitride (LiPON), and combinations thereof.

In one aspect, the one or more lithium-source precursors may be selected from the group consisting of: lithium tert-butoxide (LiOtBu), lithium bis(trimethylsilyl)amide (LiHMDS), lithium 2,2,6,6-tetramethyl-3,5-heptanedionate (Lithd), lithium amides, and combinations thereof.

In one aspect, the one or more oxidizers may be selected from the group consisting of: trimethyl phosphate ((MeO)$_3$PO) (TMPO), $H_2O$, $TiF_4$, $NH_4F$, $O_3$, $O_2$, and combinations thereof.

In one aspect, atomic layer deposition (ALD) process or the plasma enhanced atomic layer deposition (PEALD) process may have a deposition temperature of greater than or equal to about 100° C. to less than or equal to about 250° C.

In one aspect, the lithium-containing coating may be a first coating, the positive electroactive material may be defined by a plurality of positive electroactive material particles, and the positive electrode may further include at least one second lithium-containing coating surrounding at least one positive electroactive material particle of the plurality of positive electroactive material particles. The at least one second lithium-containing coating may have a thickness greater than or equal to about 0.2 nm to less than or equal to about 5 nm. The at least one second lithium-containing coating may cover greater than or equal to about 95% to less than or equal to about 100% of a total exposed surface area of the at least one positive electroactive material particle.

In one aspect, the at least one second lithium-containing coating may include a lithium-containing material selected from the group consisting of: lithium phosphates, lithium alumina, lithium niobates, lithium silicates, lithium alumina fluoride, lithium fluoride, lithium phosphorus oxynitride (LiPON), and combinations thereof.

In one aspect, the at least one second lithium-containing coating may be prepared using one of an atomic layer deposition (ALD) process and a plasma enhanced atomic layer deposition (PEALD) process, where a coating precursor includes one or more binary or ternary compounds, one or more lithium-source precursors, and one or more oxidizers.

In various aspects, the present disclosure provides a positive electrode that includes a plurality of positive electroactive material particles defining an electroactive material layer, and at least one lithium-containing coating surrounding at least one positive electroactive material particle of the plurality of positive electroactive material particles. The at least one lithium-containing coating may have a thickness greater than or equal to about 0.2 nm to less than or equal to about 5 nm. The at least one lithium-containing coating may have an ionic conductivity greater than or equal to about $10^{-7}$ S/cm to less than or equal to about $10^{-3}$ S/cm.

In one aspect, the positive electroactive material may be selected from the group consisting of: NCM 111, NCM 532, NCM 622, NCM 712, NCM 811, NCMA, NCA, LNMO, and combinations thereof.

In one aspect, the lithium-containing coating may include a lithium-containing material selected from the group consisting of: lithium phosphates, lithium alumina, lithium niobates, lithium silicates, lithium alumina fluoride, lithium fluoride, lithium phosphorus oxynitride (LiPON), and combinations thereof.

In one aspect, the lithium-containing coating may cover greater than or equal to about 95% to less than or equal to about 100% of a total exposed surface area of the at least one positive electroactive material particle.

In one aspect, the positive electrode may further include greater than 0 wt. % to less than or equal to about 1 wt. % of an electrolyte additive. The electrolyte additive may be represented by $Li[B((OCH_2)_xCF_3)_4]$, where $1 \leq x \leq 6$.

In one aspect, the positive electrode may further include a passivation layer defined by the electrolyte additive disposed on one or more exposed surfaces of the lithium-containing coating. The passivation layer may have a thickness greater than or equal to about 0.2 nm to less than or equal to about 5 nm. The passivation layer may cover greater than or equal to about 30% to less than or equal to about 50% of a total exposed surface area of the lithium-containing coating.

In one aspect, the lithium-containing coating may be a first lithium-containing coating, and the positive electrode may further include a second lithium-containing coating disposed on the electroactive material layer. The second lithium-containing coating may have a thickness greater than or equal to about 0.2 nm to less than or equal to about 5 nm. The second lithium-containing coating may cover greater than or equal to about 0.1% to less than or equal to about 50% of a total exposed surface area of the electroactive material layer. The second lithium-containing coating may include a lithium-containing material selected from the group consisting of: lithium phosphates, lithium alumina, lithium niobates, lithium silicates, lithium alumina fluoride, lithium fluoride, lithium phosphorus oxynitride (LiPON), and combinations thereof.

In one aspect, the first lithium-containing coating may be prepared using one of an atomic layer deposition (ALD) process and a plasma enhanced atomic layer deposition (PEALD) process, where a coating precursor includes one or more binary or ternary compounds, one or more lithium-source precursors, and one or more oxidizers. The one or more binary or ternary compounds may be selected from the group consisting of: lithium phosphates, lithium alumina, lithium niobates, lithium silicates, lithium alumina fluoride, lithium fluoride, lithium phosphorus oxynitride (LiPON), and combinations thereof. The one or more lithium-source precursors may be selected from the group consisting of: lithium tert-butoxide (LiOtBu), lithium bis(trimethylsilyl) amide (LiHMDS), lithium 2,2,6,6-tetramethyl-3,5-heptanedionate (Lithd), lithium amides, and combinations thereof. The one or more oxidizers may be selected from the group consisting of: trimethyl phosphate $((MeO)_3PO)$ (TMPO), $H_2O$, $TiF_4$, $NH_4F$, $O_3$, $O_2$, and combinations thereof.

In one aspect, the atomic layer deposition (ALD) process or the plasma enhanced atomic layer deposition (PEALD) process may have a deposition temperature of greater than or equal to about 100° C. to less than or equal to about 250° C.

In various aspects, the present disclosure provides a positive electrode that includes a plurality of positive electroactive material particles defining an electroactive material layer, at least one first lithium-containing coating surrounding at least one positive electroactive material particle of the plurality of positive electroactive material particles, and a second lithium-containing coating disposed on one or more surfaces of the electroactive material layer. The at least one first lithium-containing coating may cover greater than or equal to about 95% to less than or equal to about 100% of a total exposed surface area of the at least one positive electroactive material particle. The second lithium-containing coating may cover greater than or equal to about 30% to less than or equal to about 50% of a total exposed surface area of the electroactive material layer. The at least one first lithium-containing coating and the second lithium-containing coating may each include a lithium-containing material independently selected from the group consisting of: lithium phosphates, lithium alumina, lithium niobates, lithium silicates, lithium alumina fluoride, lithium fluoride, lithium phosphorus oxynitride (LiPON), and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 2I is an illustration of another example positive electrode, the positive electrode including a lithium-containing coating layer, lithium-containing particle coatings, and passivation layers on one or more exposed surfaces of the lithium-containing particle coatings in accordance with various aspects of the present disclosure;

FIG. 4A is a graphical illustration demonstrating the thermal stability of example battery cells, the example battery cells including electrolyte additives in accordance with various aspects of the present disclosure;

Corresponding reference numerals indicate corresponding parts throughout the several views of the drawings.

DETAILED DESCRIPTION

Figure 1:
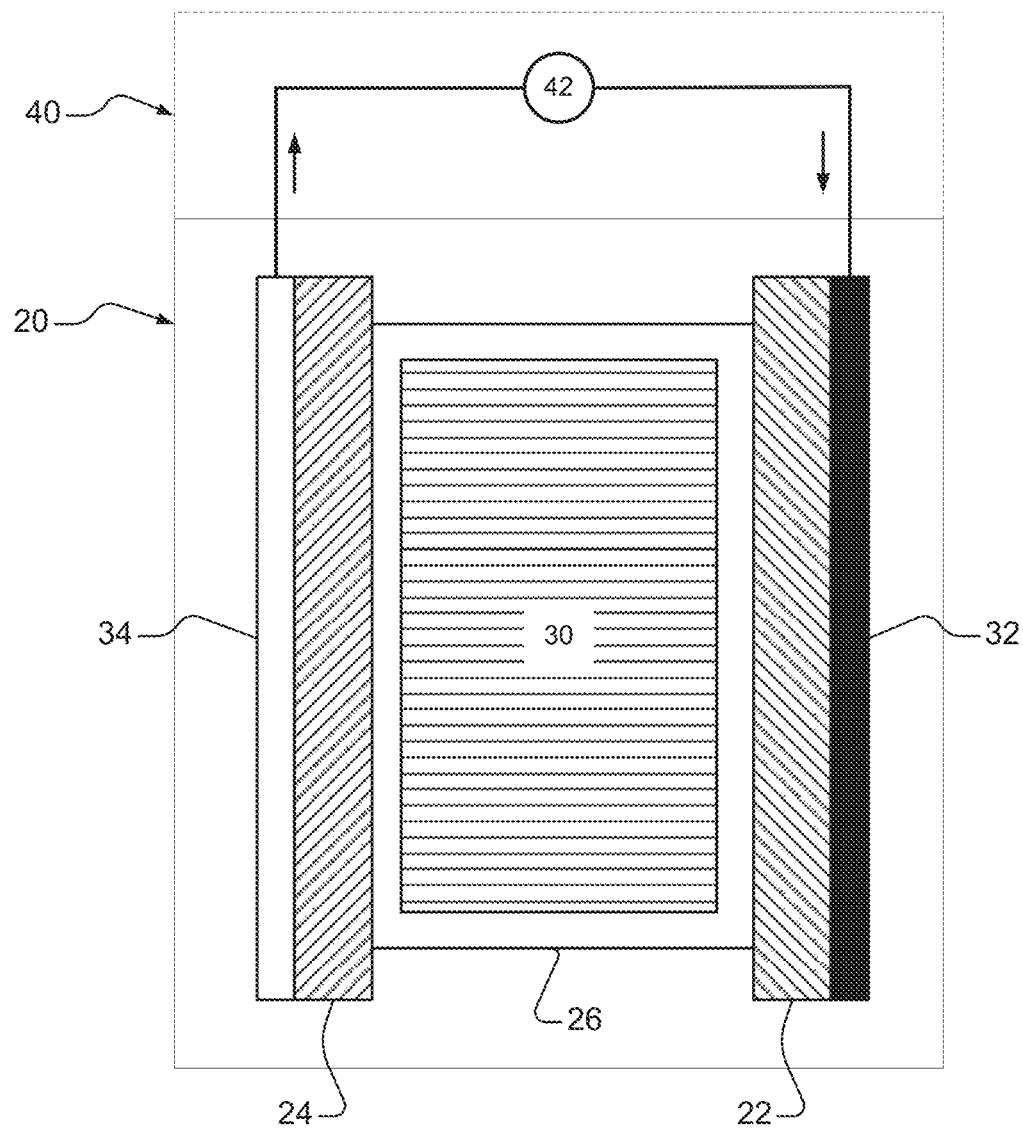
FIG. 1 is an illustration of an example electrochemical battery cell prepared in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles (not shown). In the instance of solid-state batteries and/or semi-solid-state batteries, the positive electrode 24 and/or the negative electrode 22 may include a plurality of solid-state electrolyte particles. The plurality of solid-state electrolyte particles included in, or defining, the separator 26 may be the same as or different from the plurality of solid-state electrolyte particles included in the positive electrode 24 and/or the negative electrode 22.

A first or negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A second or positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In each variation, however, the electrolyte 30 includes an electrolyte additive (not shown). For example, the electrolyte 30 may include greater than 0 wt. % to less than or equal to about 1 wt. % of the electrolyte additive. The electrolyte 30 may include greater than 0 wt. % to less than or equal to 1 wt. % of the electrolyte additive. The electrolyte additive is represented by Li[B((OCH$_2$)$_x$CF$_3$)$_4$], where 1≤x≤6. For example, the electrolyte additive may include

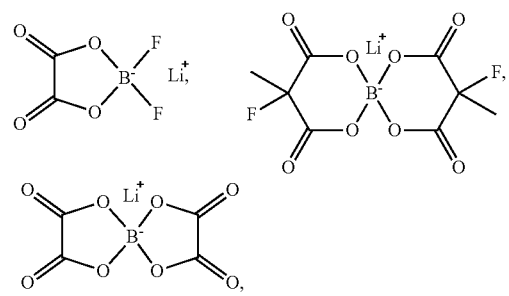

and combinations thereof.

In certain aspects, the electrolyte 30 may be a non-aqueous liquid electrolyte solution (e.g., >1M) that includes a lithium salt and the electrolyte additive dissolved in an organic solvent or a mixture of organic solvents. Numerous conventional non-aqueous liquid electrolyte 30 solutions may be employed in the lithium-ion battery 20. For example, a non-limiting list of lithium salts that may be dissolved in an organic solvent to form the non-aqueous liquid electrolyte solution include lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$(C$_2$O$_4$)), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium bis(fluorosulfonyl)imide (LiN(FSO$_2$)$_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic materials and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina (Al$_2$O$_3$), silica (SiO$_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have a thickness greater than or equal to about 1 μm to less than or equal to about 50 μm, and in certain instances, optionally greater than or equal to about 1 μm to less than or equal to about 20 μm. The separator 26 may have a thickness greater than or equal to 1 μm to less than or equal to 50 μm, and in certain instances, optionally greater than or equal to 1 μm to less than or equal to 20 μm.

The negative electrode 22 may be formed from a lithium host material that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. In certain variations, the negative electrode 22 may include a plurality of solid-state electrolyte particles (not shown). The negative electrode 22 (including the one or more layers) may have a thickness greater than or equal to about 1 μm to less than or equal to about 500 μm, and in certain aspects, optionally greater than or equal to about 10 μm to less than or equal to about 200 μm. The negative electrode 22 (including the one or more layers) may have a thickness greater than or equal to 1 μm to less than or equal to 500 μm, and in certain aspects, optionally greater than or equal to 10 μm to less than or equal to 200 μm.

The negative electrode 22 may include a negative electroactive material that comprises lithium, such as, for example, lithium metal. In certain variations, the negative electrode may be a film or layer formed of lithium metal. Other materials can also be used to form the negative electrode 22, including, for example, carbonaceous materials (such as, graphite, hard carbon, soft carbon), and/or lithium-silicon, silicon containing binary and ternary alloys, and/or tin-containing alloys (such as, Si, Li—Si, SiO$_x$ (where 0≤x≤2), Si—Sn, SiSnFe, SiSnAl, SiFeCo, SnO$_2$, and the like), and/or other volume-expanding materials (e.g., aluminum (Al), germanium (Ge)). For example, in certain variations, the negative electroactive material may include a carbonaceous-silicon based composite including, for example, about 10 wt. % SiO$_x$ (where 0≤x≤2) and about 90 wt. % graphite.

In certain variations, the negative electroactive material(s) in the negative electrode 22 may be optionally intermingled with one or more electrically conductive materials that provide an electron conductive path and/or at least one polymeric binder material that improves the structural integrity of the negative electrode 22. For example, the negative electroactive material(s) in the negative electrode 22 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the negative electrode 22 may include greater than or equal to about 10 wt. % to less than or equal to about 99 wt. %, and in certain variations, greater than or equal to about 50 wt. % to less than or equal to about 95 wt. %, of the negative electroactive material(s); greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder. The negative electrode 22 may include greater than or equal to 10 wt. % to less than or equal to 99 wt. %, and in certain variations, greater than or equal to 50 wt. % to less than or equal to 95 wt. %, of the negative electroactive material(s); greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

The positive electrode 24 may be formed from a lithium-based active material that is capable of undergoing lithium intercalation and deintercalation, alloying and dealloying, or plating and stripping, while functioning as the positive terminal of the battery 20. The positive electrode 24 can be defined by a plurality of electroactive material particles (for example, as illustrated in FIGS. 2B and 2B). Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. For example, in certain variations, the positive electrode 24 may include a plurality of solid-state electrolyte particles (not shown). In each instance, the positive electrode 24 may have a thickness greater than or equal to about 1 μm to less than or equal to about 500 μm, and in certain aspects, optionally greater than or equal to about 10 μm to less than or equal to about 200 μm. The positive electrode 24 may have a thickness greater than or equal to 1 μm to less than or equal to 500 μm, and in certain aspects, optionally greater than or equal to 10 μm to less than or equal to 200 μm.

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$) (LMO), lithium manganese nickel oxide ($LiMn_{(2-x)}Ni_xO_4$, where $0 \leq x \leq 0.5$) (LNMO) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O_2$) (NMC), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$) (LFP), lithium manganese-iron phosphate ($LiMn_{2-x}Fe_xPO_4$, where $0<x<0.3$) (LFMP), or lithium iron fluorophosphate ($Li_2FePO_4F$).

In various aspects, the positive electrode 24 may be a nickel-rich cathode represented by:

$$LiM^1_xM^2_yM^3_zM^4_{(1-x-y-z)}O_2$$

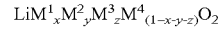

where M1, M2, M3, and M4 are transitions metals (for example, independently selected from the group consisting of: nickel (Ni), manganese (Mn), cobalt (Co), aluminum (Al), iron (Fe), and combinations thereof), $0 \leq x \leq 1$, $0 \leq y \leq 1$, and $0 \leq z \leq 1$. For example, the positive electrode 24 may include NCM 111, NCM 532, NCM 622, NCM 712, NCM 811, NCMA, NCA, LNMO, and combinations thereof. In such instances, the positive electrode 24 may further include one or more lithium-containing coatings (e.g. a first lithium-containing coating and/or a second lithium-containing coating).

Figure 2A:
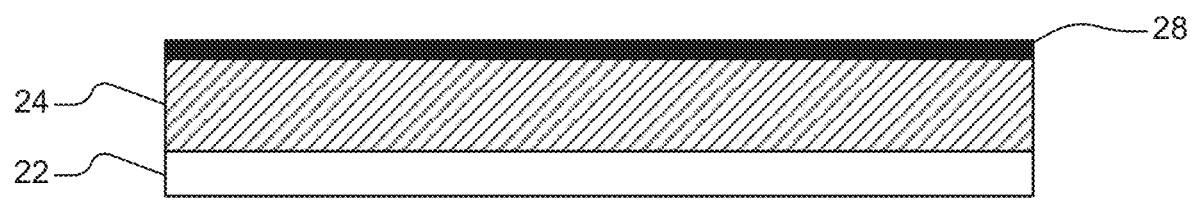
FIG. 2A is an illustration of an example positive electrode, the positive electrode including a lithium-containing coating layer in accordance with various aspects of the present disclosure.
Figure 2B:
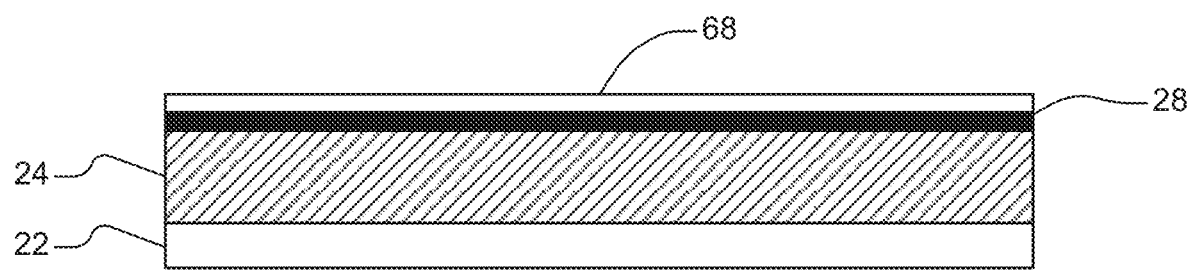
FIG. 2B is an illustration of another example positive electrode, the positive including a lithium-containing coating layer and a passivation layer on one or more exposed surfaces of the lithium-containing coating layer in accordance with various aspects of the present disclosure.

For example, as illustrated in FIG. 2A, the positive electrode 24 may include a lithium-containing coating layer 28 disposed on one or more exposed surfaces of the positive electrode 24. For example, the lithium-containing coating layer 28 may cover greater than or equal to about 30% to less than or equal to about 50%, and in certain aspects, optionally greater than or equal to 30% to less than or equal to 50%, of a total surface area of the one or more exposed surfaces of the positive electrode 24. The lithium-containing coating layer 28 may have a thickness greater than or equal to about 0.2 nm to less than or equal to about 5 nm, and in certain aspects, optionally greater than or equal to 0.2 nm to less than or equal to 5 nm. In certain variations, as illustrated in FIG. 2B, during cell formation cycles, the electrolyte additive may form a passivation layer 68 (that mitigates electrolyte decomposition and oxygen release) on one or more exposed surface of the lithium containing coating layer 28. The passivation layer 68 may form as the electrolyte additive decomposes at the interface of the lithium-containing coating layer 28. For example, the passivation layer 68 may cover greater than or equal to about 0.1% to less than or equal to about 50%, and in certain aspects, optionally greater than or equal to 0.1% to less than or equal to 50%, of a total exposed surface area of the lithium-containing coating layer 28. The passivation layer 68 may have a thickness greater than or equal to about 0.1 nm to less than or equal to about 100 nm, and in certain aspects, optionally greater than or equal to 0.1 nm to less than or equal to 100 nm. Although not illustrated, in certain variations, the electrolyte additive may also fill voids or cracks in the lithium-containing coating layer 28 so as to aid and maintain interface stability during an initial and subsequent cell cycles. For example, the electrolyte additive may diffuse into and form new passivation layers in the voids or cracks. That is, the lithium-containing coating layer 28 and electrolyte additive are complementary, working together to improve the electrochemical performance and thermal stability of the battery 20.

Figure 2C:
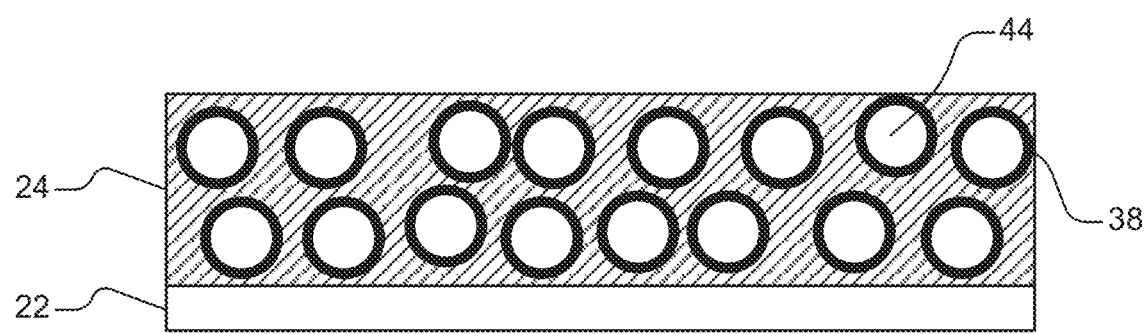
FIG. 2C is an illustration of another example positive electrode, the positive electrode including lithium-containing particle coatings in accordance with various aspects of the present disclosure.
Figure 2D:
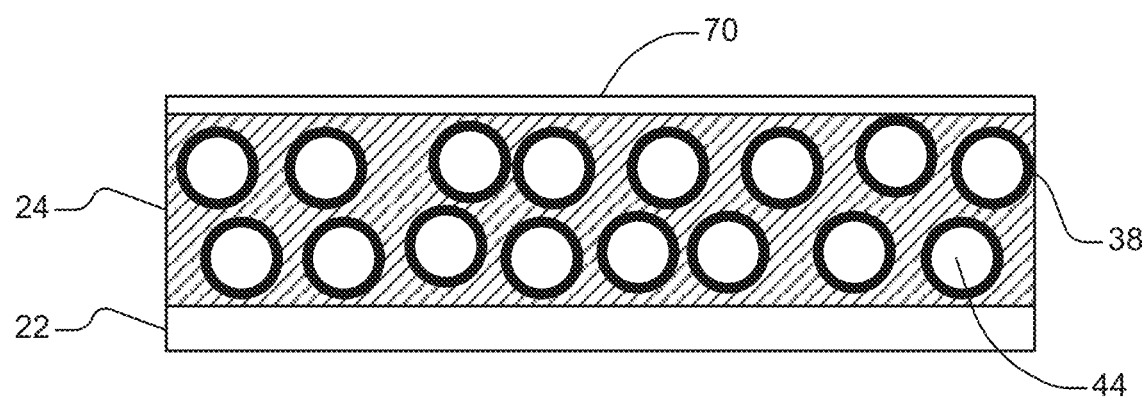
FIG. 2D is an illustration of another example positive electrode, the positive electrode including lithium-containing particle coatings and a passivation layer on one or more exposed surfaces of the positive electrode in accordance with various aspects of the present disclosure.
Figure 2E:
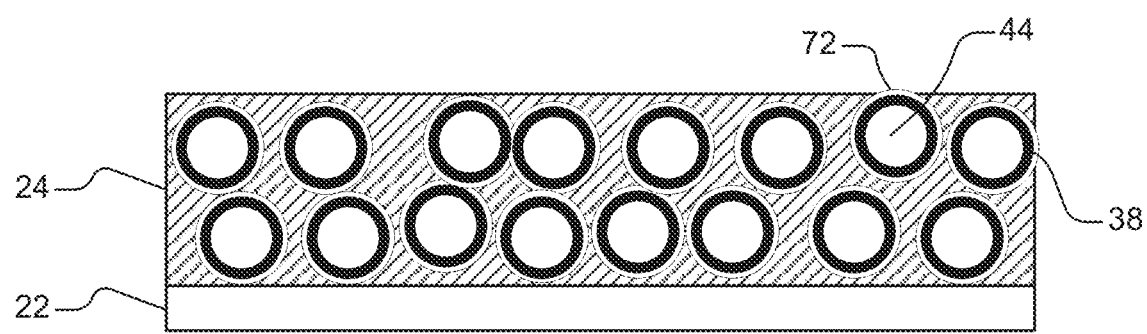
FIG. 2E is an illustration of another example positive electrode, the positive electrode including lithium-containing particle coatings and passivation layers on one or more exposed surfaces of the lithium-containing particle coatings in accordance with various aspects of the present disclosure.
Figure 2F:
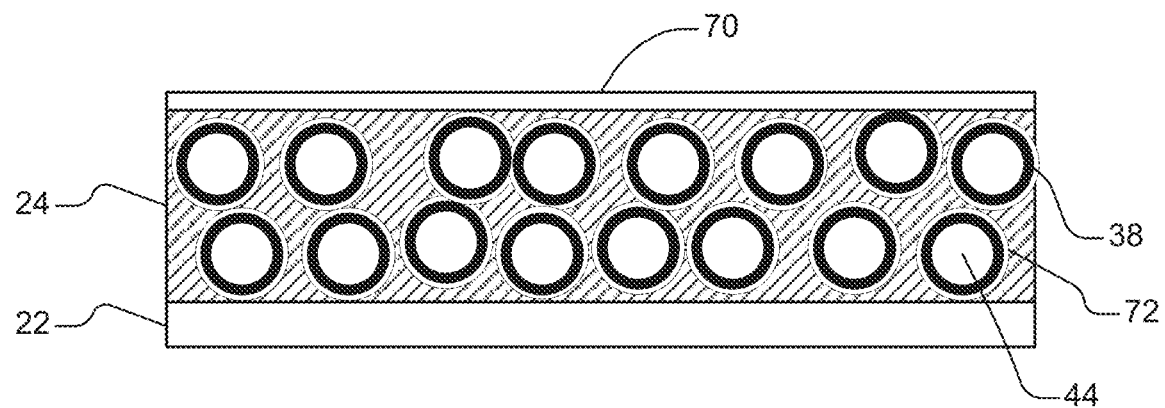
FIG. 2F is an illustration of another example positive electrode, the positive electrode including lithium-containing particle coatings, a first passivation layer on one or more exposed surfaces of the positive electrode, and a second passivation layer on one or more exposed surfaces of the lithium-containing particle coatings in accordance with various aspects of the present disclosure.

In other variations, as illustrated in FIG. 2C, one or more of the plurality of electroactive material particles 44 that define the positive electrode 24 may be coated with lithium-containing particle coatings 38. For example, the lithium-containing particle coatings 38 may cover greater than or equal to about 95% to less than or equal to about 100% of a total exposed surface area of each coated electroactive material particle 44. The lithium-containing particle coatings 38 may have thicknesses greater than or equal to about 0.2 nm to less than or equal to about 5 nm. In certain variations, as illustrated in FIG. 2D, during a first cell cycle, the electrolyte additive may form a passivation layer 70 (that mitigates electrolyte decomposition and oxygen release) on one or more exposed surface of the positive electrode 24. For example, the passivation layer 70 may cover greater than or equal to about 0.1% to less than or equal to about 50% of a total exposed surface area of the positive electrode 24. The passivation layer 70 may have a thickness greater than or equal to about 0.1 nm to less than or equal to about 100 nm. In other variations, as illustrated in FIG. 2E, during a first cell cycle, the electrolyte additive may form passivation layers 72 (that mitigates electrolyte decomposition and oxygen release) on one or more exposed surface of the lithium-containing particle coatings 38. For example, the passivation layers 72 may cover greater than or equal to about 0.1% to less than or equal to about 50% of a total exposed surface area each lithium-containing particle coating 38. The passivation layers 72 may have thicknesses greater than or equal to about 0.1 nm to less than or equal to about 100 nm. Although not illustrated, in certain variations, the electrolyte additive may also fill voids or cracks in the lithium-containing particle coating 38, so as to aid and maintain interface stability during an initial and subsequent cell cycles. Further still, in certain variations, as illustrated in FIG. 2F, during a first cell cycle, the electrolyte additive may form passivation layers 72 (that mitigates electrolyte decomposition and oxygen release) on one or more exposed surface of the lithium-containing particle coatings 38, and passivation layers 70 on one or more exposed surface of the positive electrode 24.

Figure 2G:
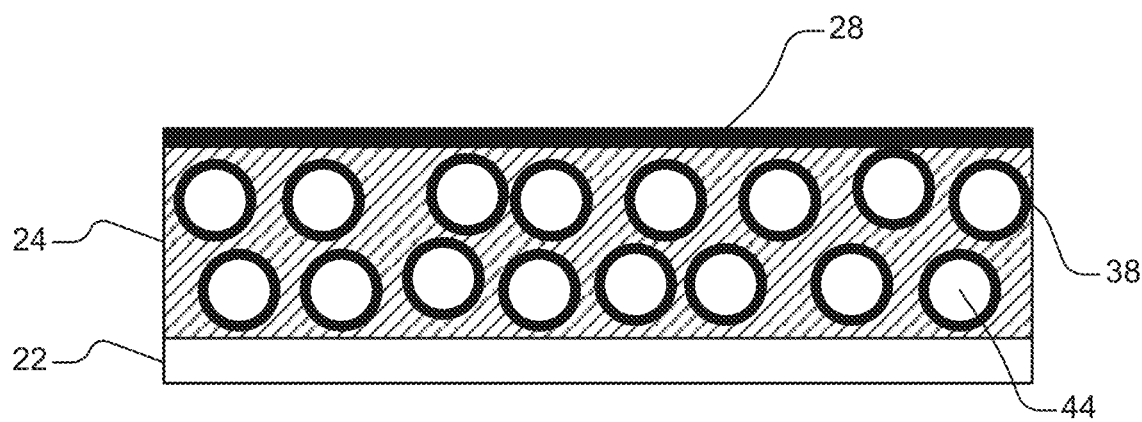
FIG. 2G is an illustration of another example positive electrode, the positive electrode including a lithium-containing coating layer and lithium-containing particle coatings in accordance with various aspects of the present disclosure.
Figure 2H:
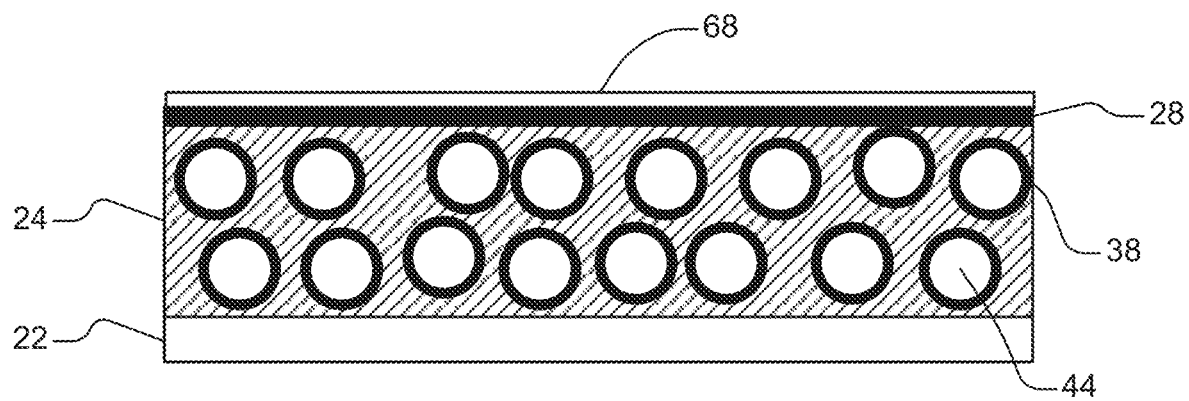
FIG. 2H is an illustration of another example positive electrode, the positive electrode including a lithium-containing coating layer, lithium-containing particle coatings, and a passivation layer on one or more surfaces of the lithium-containing coating layer in accordance with various aspects of the present disclosure.
Figure 21:
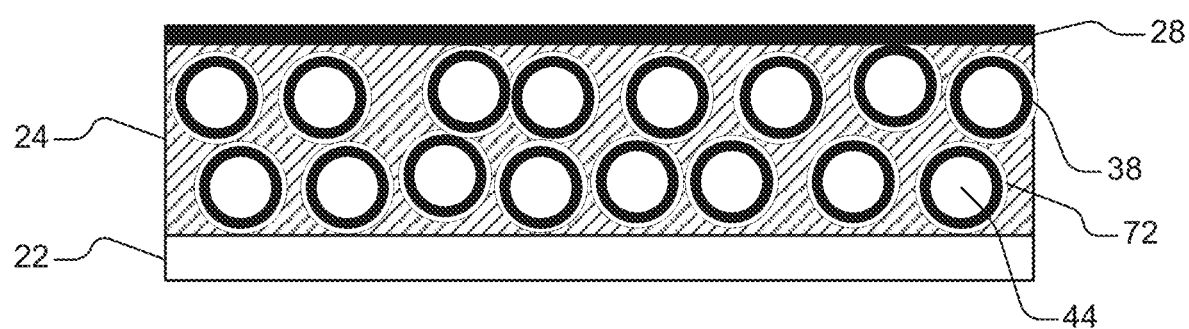

In still further variations, as illustrated in FIG. 2G, the positive electrode 24 may include a lithium-containing coating layer 28 (i.e., first lithium-containing coating) disposed on one or more exposed surfaces of the positive electrode 24, and one or more of the plurality of electroactive material particles 44 that define the positive electrode 24 may be coated with a lithium-containing particle coatings 38 (i.e., second lithium-containing coating). In certain variations, as illustrated in FIG. 2H, during a first cell cycle, the electrolyte additive may form a passivation layer 68 (that mitigates electrolyte decomposition and oxygen release) on one or more exposed surface of the lithium containing coating layer 28. In other variations, as illustrated in FIG. 2I, during a first cell cycle, the electrolyte additive may form passivation layers 72 (that mitigates electrolyte decomposition and oxygen release) on one or more exposed surface of the lithium-containing particle coatings 38. Further still, although not illustrated, the skilled artisan will recognize that, in certain variations, during a first cell cycle, the electrolyte additive may form passivation layers (that mitigates electrolyte decomposition and oxygen release) on one or more exposed surface of the lithium-containing particle coatings 38, and passivation layers on one or more exposed surface of the positive electrode 24.

In each instance, the lithium-containing coating layers 28 and/or the lithium-containing particle coatings 38 may have an ionic conductivity greater than or equal to about $10^{-7}$ s/cm to less than or equal to about $10^{-3}$ s/cm at room temperature, such that lithium ions ($Li^+$) are able to pass through the lithium-containing coating layers 28 and/or the lithium-containing particle coatings 38. In certain variations, the lithium-containing coating layers 28 and/or the lithium-containing particle coatings 38 may include lithium phosphates (e.g., $Li_xPO_y$), lithium alumina (e.g., $LiAl_xO_y$), lithium niobates (e.g., $LiNb_xO_y$), lithium silicates (e.g., $LiSi_xO_y$), lithium alumina fluoride (e.g., $LiAl_xF_y$), lithium fluoride ($LiF_x$), lithium phosphorus oxynitride (LiPON), and combinations thereof.

The lithium-containing coating layers 28 and/or the lithium-containing particle coatings 38 may act as protective layers that provide protection against metal dissolution and various side reactions (for example, with the electrolyte and/or negative electroactive material) during battery cycling, while also facilitating ion transportation dynamics at various interfaces. For example, the lithium-containing coating layers 28 and/or the lithium-containing particle coatings 38 may passivate the positive electrode 24, and more particularly, the plurality of (positive) electroactive material particles 44, such that the positive electrode 24 and/or electroactive material particles 44 do not contact the electrolyte 30. Thereby, reducing or minimizing side reactions between the electrolyte and the positive electrode 24 and/or electroactive material particles 44. The With renewed reference to FIG. 1, in certain variations, the positive electroactive material(s) in the positive electrode 24 may be optionally intermingled with an electronically conducting material that provides an electron conduction path and/or at least one polymeric binder material that improves the structural integrity of the electrode 24. For example, the positive electroactive material(s) in the positive electrode 24 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

The positive electrode 24 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 98 wt. %, of the positive electroactive material(s); greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder. The positive electrode 24 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 98 wt. %, of the positive electroactive material(s); greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

In various aspects, the present disclosure provides methods for forming the cathode coatings, including lithium-containing coating layers and/or lithium-containing particle coatings, for example as illustrated in FIGS. 2A-2I. The methods may be performed using commercially available atomic layer deposition (ALD) and/or plasma enhanced atomic layer deposition (PEALD) techniques and equipment that facilitate tight control of temperature, pressure, and/or dosing. Atomic layer deposition (ALD) and plasma enhanced atomic layer deposition (PEALD) are self-limiting processes for formation (i.e., chemical deposition or growth) of substantially uniformed and ultrathin coatings. Plasma enhanced atomic layer deposition (PEALD) differs from atomic layer deposition (ALD) insofar as atomic layer deposition (ALD) is a purely thermal process and plasma enhanced atomic layer deposition (PEALD) is a plasma-assisted process. Plasma enhanced atomic layer deposition (PEALD) are generally easier to control (for example, allowing the use of lower deposition temperatures), and also, more cost effective.

Atomic layer deposition (ALD) and plasma enhanced atomic layer deposition (PEALD) typically include subjecting the target substrate or surface (e.g., positive electrode and/or positive electroactive material particles) to self-saturating gas-phase, surface reactions. For example, atomic layer deposition (ALD) and plasma enhanced atomic layer deposition (PEALD) are typically conducted in an apparatus having a vacuum deposition chamber, which holds the target. In certain variations, the vacuum deposition chamber may include rotating axles for roll-to-roll processing of the target substrate. The vacuum deposition chamber is configured to allow the introduction of vapor source (i.e., coating precursor) and/or a carrier gas. The vapor source and carrier gas may be introduced simultaneously or consecutively. For example, the vapor source may be pulsed into the vacuum deposition chamber on the carrier gas. Likewise, the vacuum deposition chamber may be purged of the vapor source and/or carrier gas using, for example, vacuum pumping or flushing with an inert gas. Pulsing and purging of the vacuum deposition chamber may be controlled so as to manage the dose of vapor source to which the target substrate is exposed.

In various aspects, the coating precursor may include one or more binary or ternary compounds, one or more lithium-source precursors, and one or more oxidizers (for example, with and/or without plasma). The binary or ternary compounds may include, for example, lithium phosphates (e.g., $Li_xPO_y$), lithium alumina (e.g., $LiAl_xO_y$), lithium niobates (e.g., $LiNb_xO_y$), lithium silicates (e.g., $LiSi_xO_y$), lithium alumina fluoride (e.g., $LiAl_xF_y$), lithium fluoride ($LiF_x$), lithium phosphorus oxynitride (LiPON), and combinations thereof. The lithium-source precursors may include, for example, lithium tert-butoxide (LiOtBu), lithium bis(trimethylsilyl)amide (LiHMDS), lithium 2,2,6,6-tetramethyl-3,5-heptanedionate (Lithd), lithium amides, and combinations thereof. In other variations, an example precursor for phosphate may be trimethyl phosphate $((MeO)_3PO)$ (TMPO), an example precursor for silicon may be TEOS, an example precursor for titanium may be TTIP, an example precursor for aluminum may be TMA, and an example precursor of niobium may be $NB(OEt)_5$. The oxidizers may include, for example, trimethyl phosphate $((MeO)_3PO)$ (TMPO), $H_2O$, $TiF_4$, $NH_4F$, $O_3$, $O_2$, and combinations thereof. In the instance of atomic layer deposition (ALD), the carrier gas may include, for example, Ar and/or $N_2$. In the instance of plasma enhanced atomic layer deposition (PEALD), the carrier gas may include, for example, Ar, $O_2$, $O_3$, $N_2$, $NH_3$, and combinations thereof.

The vacuum deposition chamber may also include one or more controls configured to control the exposure of the target substrate to the coating precursor and/or carrier gas. The one or more controls may include, for example only, heaters, coolers, flow routing and valves and the like. In various aspects, a deposition temperature for the atomic layer deposition (ALD) and/or plasma enhanced atomic layer deposition (PEALD) processes may be greater than or equal to about room temperature to less than or equal to about 400° C., greater than or equal to about 100° C. to less than or equal to about 300° C., and in certain aspects, optionally greater than or equal to about 100° C. to less than or equal to about 250° C. In certain variations, the deposition temperature for the atomic layer deposition (ALD) and/or plasma enhanced atomic layer deposition (PEALD) processes may be greater than or equal to room temperature to less than or equal to 400° C., greater than or equal to 100° C. to less than or equal to 300° C., and in certain aspects, optionally greater than or equal to 100° C. to less than or equal to 250° C. For example, in the instance of atomic layer deposition (ALD), the lithium conductive coating process may occur at a temperature greater than or equal to about 200° C. to less than or equal to about 300° C., and in the instance of plasma enhanced atomic layer deposition (PEALD) the lithium conductive coating process may occur at a temperature greater than or equal to about 100° C. to less than or equal to about 300° C. In certain variations, in the instance of atomic layer deposition (ALD), the lithium conductive coating process may occur at a temperature greater than or equal to 200° C. to less than or equal to 300° C., and in the instance of plasma enhanced atomic layer deposition (PEALD) the lithium conductive coating process may occur at a temperature greater than or equal to 100° C. to less than or equal to 300° C.

In one example, the one or more binary or ternary compounds may include lithium phosphates (e.g., $Li_xPO_y$), the one or more lithium-source precursors may include lithium tert-butoxide (LiOtBu), and the one or more oxidizers may include trimethyl phosphate $((MeO)_3PO)$ (TMPO). In such instances, the deposition temperature may be greater than or equal to about 225° C. to less than or equal to about 300° C., and in certain aspects, optionally greater than or equal to 225° C. to less than or equal to 300° C., while a sublimation temperature of trimethyl phosphate $((MeO)_3PO)$ (TMPO) is greater than or equal to about 70° C. to less than or equal to about 80° C., and in certain aspects, optionally greater than or equal to 70° C. to less than or equal to 80° C., and a sublimation temperature of LiOtBu is about 170° C., and in certain aspects, optionally 170° C.

Certain features of the current technology are further illustrated in the following non-limiting examples.

Example 1

Example battery cells may be prepared in accordance with various aspects of the present disclosure.

For example, an example battery cell 410 may include a positive electrode comprising a nickel-manganese-cobalt-aluminum (NCMA) electroactive material (e.g., NMCA Ni85) and cathode coatings (including both electrode layer coatings and particle coatings) having thicknesses of about 2 nm prepared in accordance with various aspects of the present disclosure.

An example battery cell 420 may include a positive electrode comprising a nickel-manganese-cobalt-aluminum (NCMA) electroactive material (e.g., NMCA Ni85) and cathode coatings (including both electrode layer coatings and particle coatings) having thicknesses of about 5 nm, prepared in accordance with various aspects of the present disclosure.

A comparative battery cell 430 may also include a positive electrode comprising a nickel-manganese-cobalt-aluminum (NCMA) electroactive material (e.g., NMCA Ni85). The comparative battery cell 430, however, is free of cathode coating, as prepared in accordance with various aspects of the present disclosure.

Figure 3:
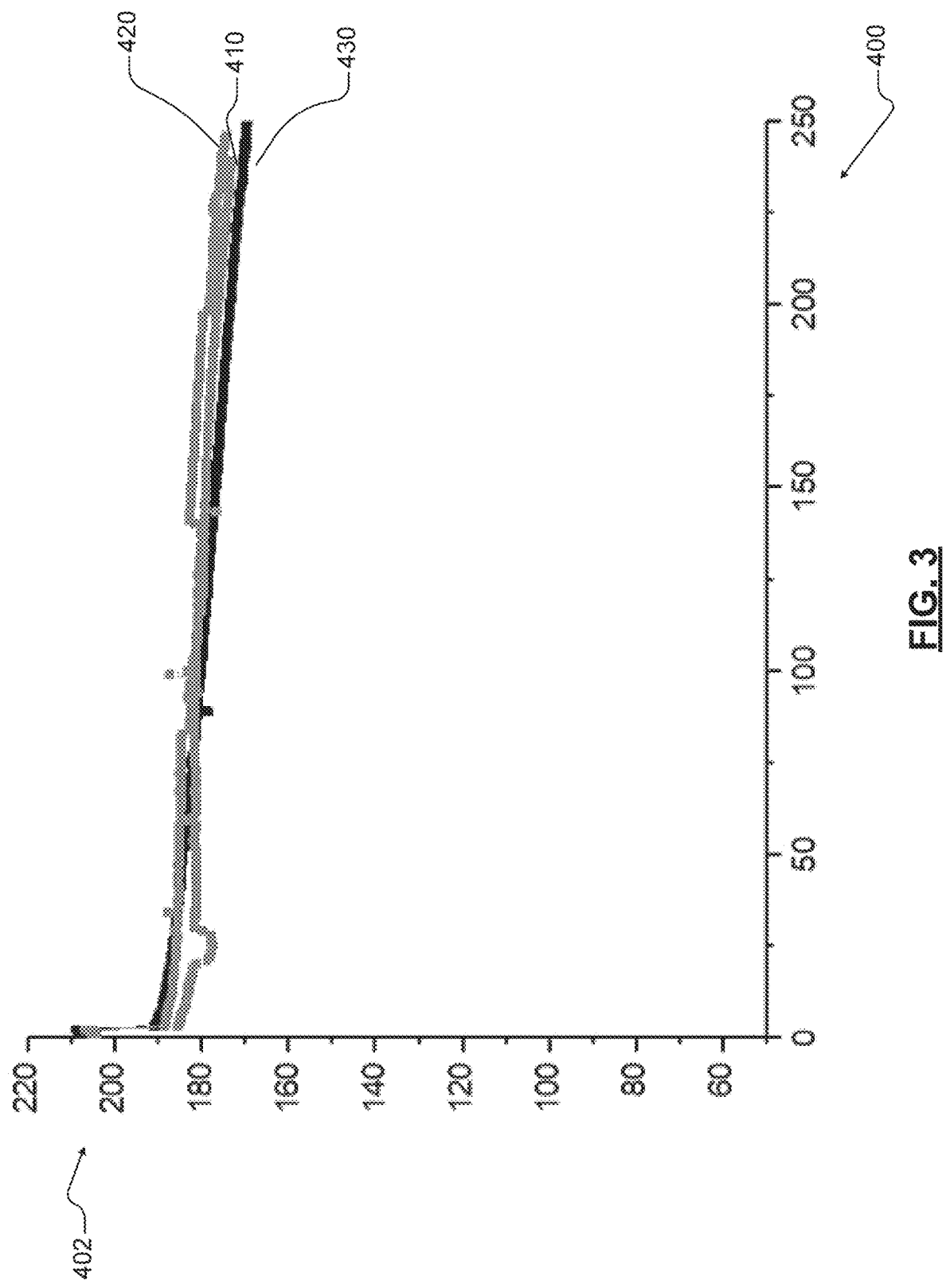
FIG. 3 is a graphical illustration demonstrating the capacity retention of example battery cells, the example battery cells including cathode coatings in accordance with various aspects of the present disclosures.

FIG. 3 is a graphical illustration representing the capacity retention of the example battery cells 410, 420 as compared to the comparative battery cell 430, where the x-axis 400 represents cycle number, and the y-axis 402 represents capacity (mAh/g). As illustrated, the example battery cells 410, 420, including the cathode coatings, in accordance with various aspects of the present disclosure, have improved long term performance as compared to the comparative battery cell 430.

Example 2

Example battery cells may be prepared in accordance with various aspects of the present disclosure.

For example, an example battery cell 510 may include a positive electrode comprising a nickel-manganese-cobalt-aluminum (NCMA) electroactive material (e.g., NMCA Ni85) and about 0.25 wt. % of an electrolyte additive (e.g., lithium difluoroborate (LiDFOB)), prepared in accordance with various aspects of the present disclosure.

An example battery cell 520 may include a positive electrode comprising a nickel-manganese-cobalt-aluminum (NCMA) electroactive material (e.g., NMCA Ni85) and about 0.5 wt. % of an electrolyte additive (e.g., lithium difluoroborate (LiDFOB)), prepared in accordance with various aspects of the present disclosure.

An example battery cell 530 may include a positive electrode comprising a nickel-manganese-cobalt-aluminum (NCMA) electroactive material (e.g., NMCA Ni85) and about 1.0 wt. % of an electrolyte additive (e.g., lithium difluoroborate (LiDFOB)), prepared in accordance with various aspects of the present disclosure.

A comparative battery cell 540 may also include a positive electrode comprising a nickel-manganese-cobalt-aluminum (NCMA) electroactive material (e.g., NMCA Ni85). The comparative battery cell 540, however, is free of electrolyte additives.

FIG. 4A is a graphical illustration representing the thermal stability of the example battery cells 510, 520, 530 as compared to the comparative battery cell 540, where the x-axis 500 represents temperature (° C.), and the y-axis 502 represents weight percentage (wt. %). As illustrated, the example battery cells 510, 520, 530, including electrolyte additives, in accordance with various aspects of the present disclosure, have improved thermal stability as compared to the comparative battery cell 540.

Figure 4B:
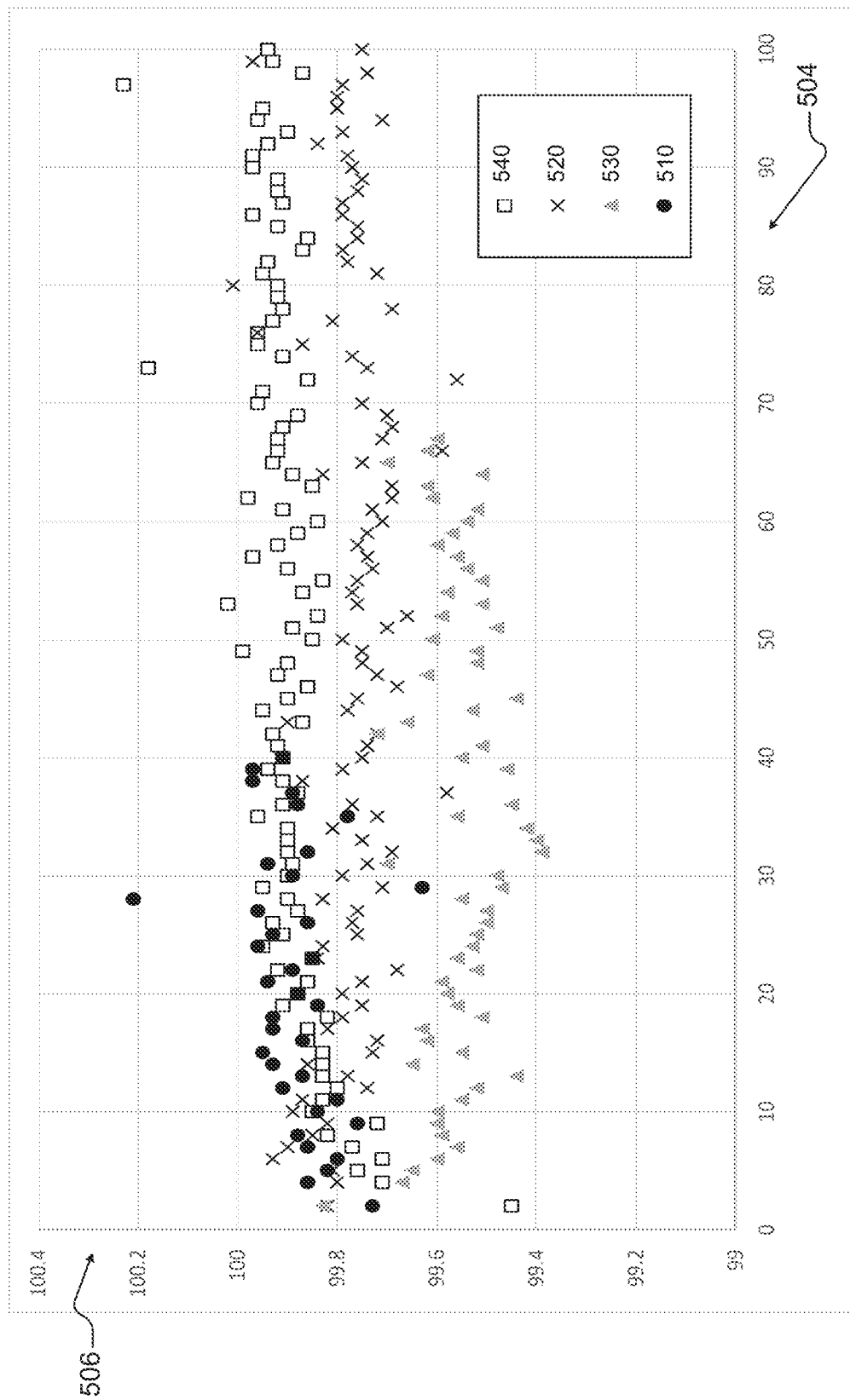
FIG. 4B is a graphical illustration demonstrating the Coulombic efficiency of example battery cells, the example battery cells including electrolyte additives in accordance with various aspects of the present disclosure.

FIG. 4B is a graphical illustration representing the Coulombic efficiency of the example battery cells 510, 520, 530 as compared to the comparative battery cell 540, where the x-axis 504 represents cycle number, and the y-axis 506 represents Coulombic efficiency (%). As illustrated, the example battery cells 510, 520, 530, including electrolyte additives, in accordance with various aspects of the present disclosure, have improved efficiencies as compared to the comparative battery cell 540.

Figure 4C:
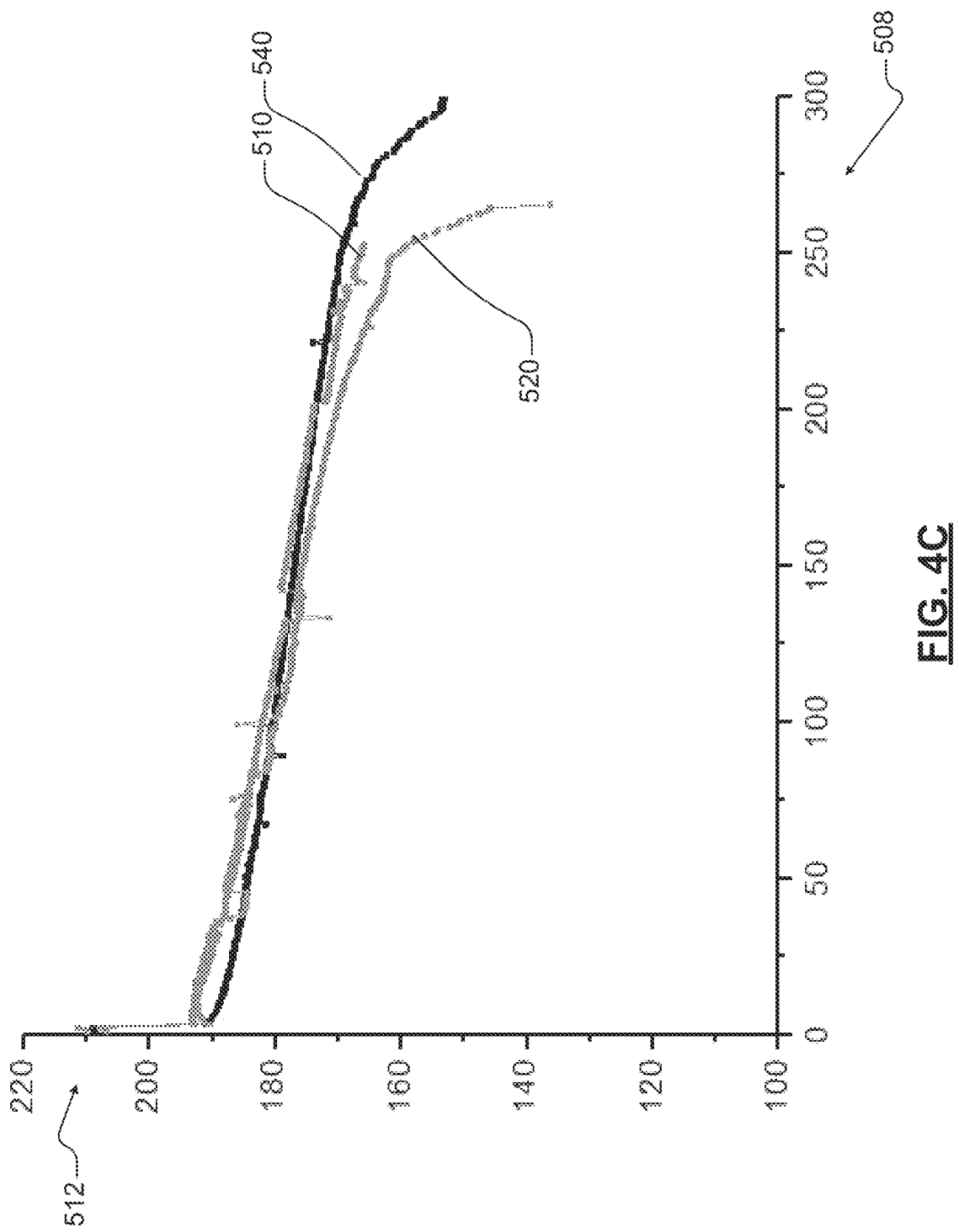
FIG. 4C is a graphical illustration demonstrating the capacity retention of example battery cells, the example battery cells including electrolyte additives in accordance with various aspects of the present disclosure.

FIG. 4C is a graphical illustration representing the capacity retention of the example battery cells 510, 520 as compared to the comparative battery cell 540, where the x-axis 508 represents cycle number, and the y-axis 512 represents capacity (mAh/g). As illustrated, the example battery cells 510, 520 including electrolyte additives, in accordance with various aspects of the present disclosure, have improved capacity retentions as compared to the comparative battery cell 540.

Example 3

Example battery cells may be prepared in accordance with various aspects of the present disclosure.

An example battery cell 610 may include a positive electrode comprising a nickel-manganese-cobalt-aluminum (NCMA) electroactive material (e.g., NMCA Ni85) and cathode coatings (including both electrode layer coatings and particle coatings). The example battery cell 610 may further include about 0.25 wt. % of an electrolyte additive (e.g., lithium difluoroborate (LiDFOB)).

A comparative battery cell 620 may also include a positive electrode comprising a nickel-manganese-cobalt-aluminum (NCMA) electroactive material (e.g., NMCA Ni85). The comparative battery cell 620, however, is free of cathode coatings and electrolyte additives.

A comparative battery cell 630 may also include a positive electrode comprising a nickel-manganese-cobalt-aluminum (NCMA) electroactive material (e.g., NMCA Ni85) and an electrolyte additive. The comparative battery cell 630, however, is free from cathode cathodes.

A comparative battery cell 640 may also include a positive electrode comprising a nickel-manganese-cobalt-aluminum (NCMA) electroactive material (e.g., NMCA Ni85) and cathode coatings (including both electrode layer coatings and particle coatings). The comparative battery cell 640, however, is free from electrolyte additives.

Figure 5:
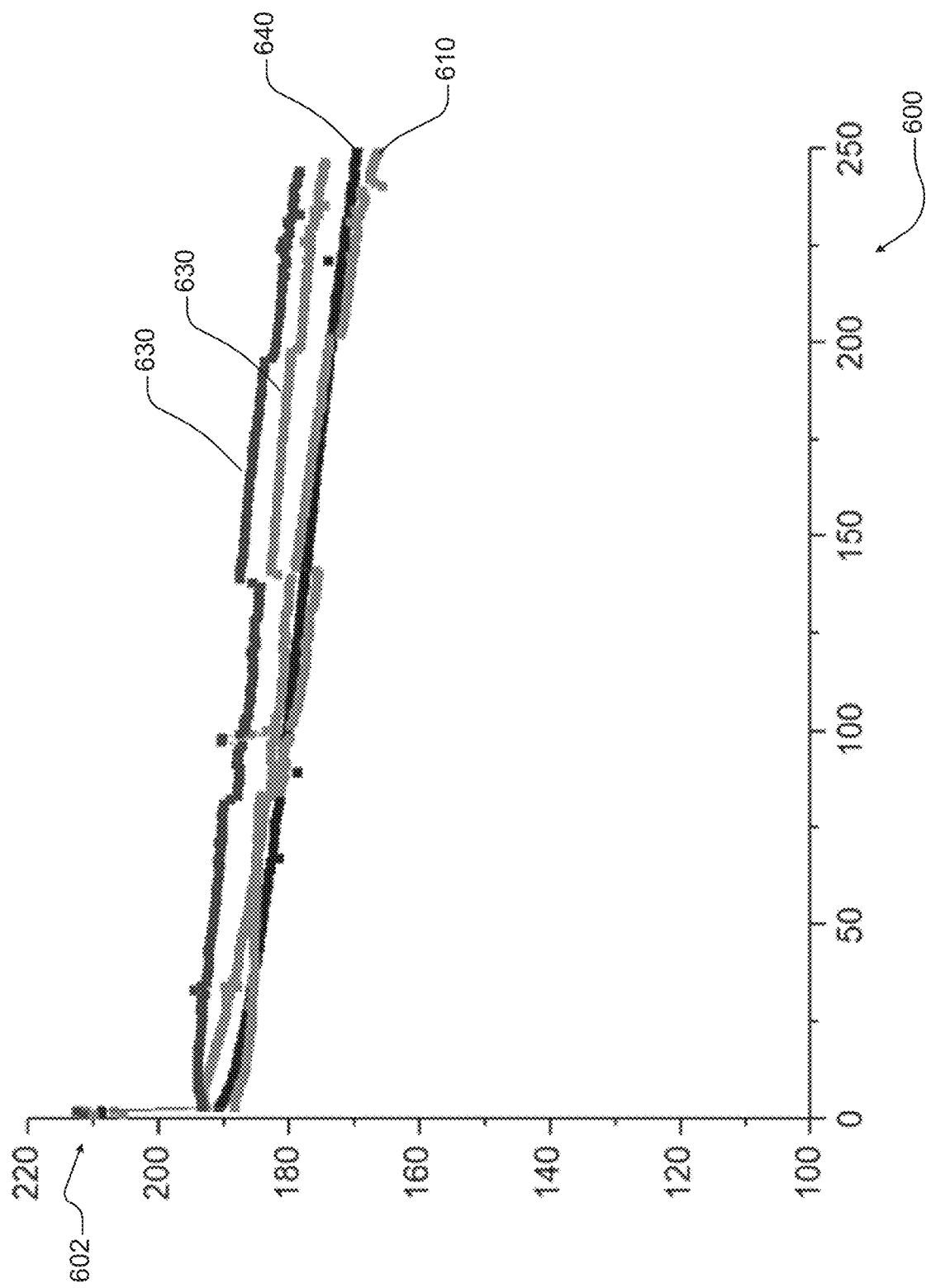
FIG. 5 is a graphical illustration demonstrating the capacity retention of example battery cells, the example battery cells including cathode coatings and electrolyte additives in accordance with various aspects of the present disclosure.

FIG. 5 is a graphical illustration representing the capacity retention of the example battery cell 610 as compared to the comparative battery cells 620, 630, 640, where the x-axis 600 represents cycle number, and the y-axis 602 represents capacity (mAh/g). As illustrated, the example battery cell 610, including the cathode coatings and the electrolyte additives, in accordance with various aspects of the present disclosure, have improved capacity retention as compared to the comparative battery cells 620, 630, 640.

Example 4

Example battery cells may be prepared in accordance with various aspects of the present disclosure.

An example battery cell 710 may include a positive electrode comprising a nickel-manganese-cobalt-aluminum (NCMA) electroactive material (e.g., NMCA Ni85) and cathode coatings (including both electrode layer coatings and particle coatings).

An example battery 720 may include a positive electrode comprising a nickel-manganese-cobalt-aluminum (NCMA) electroactive material (e.g., NMCA Ni85) and an electrolyte additive (e.g., lithium difluoroborate (LiDFOB)).

A comparative battery cell 730 may also include a positive electrode comprising a nickel-manganese-cobalt-aluminum (NCMA) electroactive material (e.g., NMCA Ni85).

The comparative battery cell 620, however, is free of cathode coatings and electrolyte additives.

Figure 6:
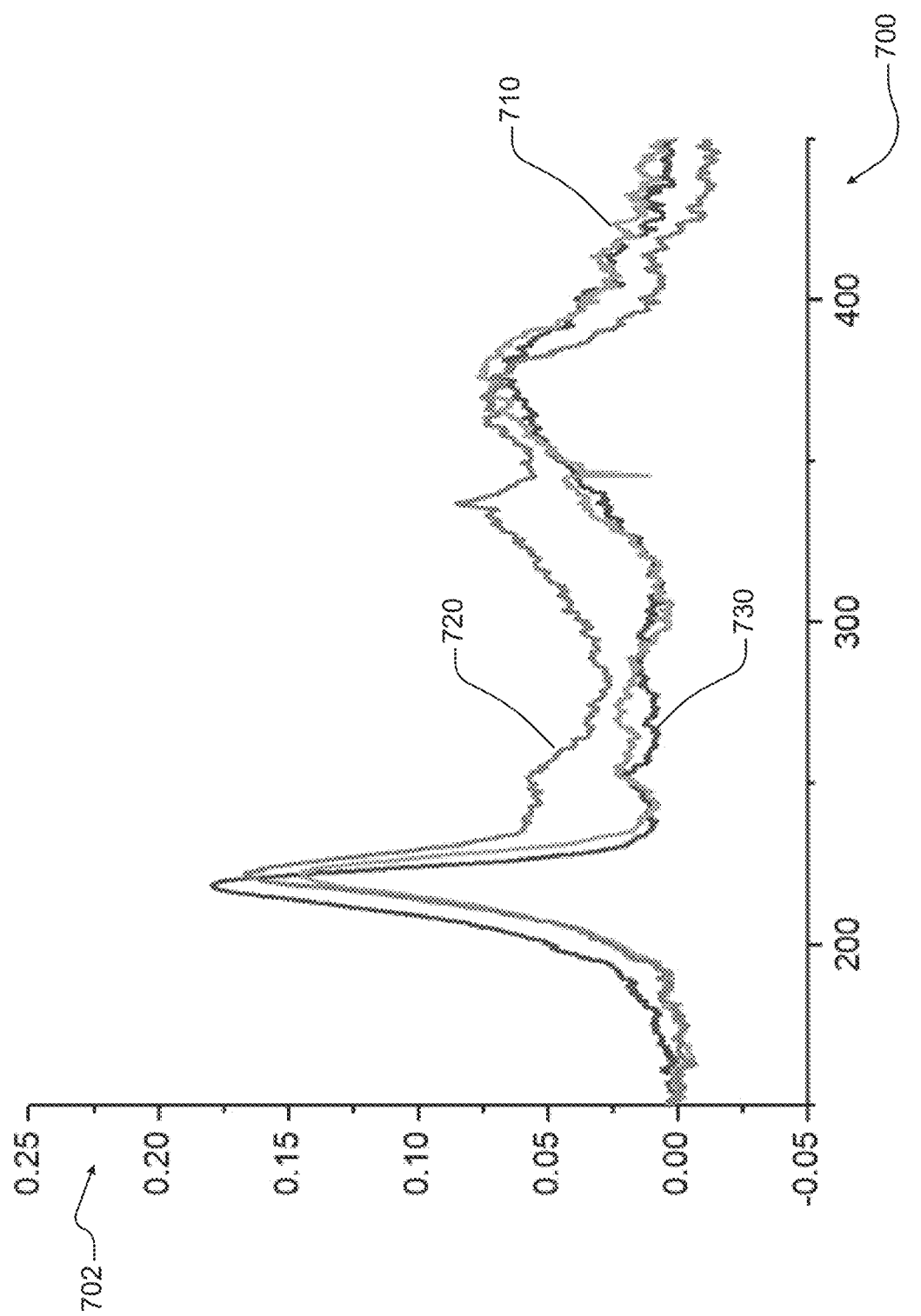
FIG. 6 is a graphical illustration demonstrating the thermal stability of example battery cells, the example battery cells including cathode coatings and electrolyte additives in accordance with various aspects of the present disclosure.

FIG. 6 is a graphical illustration representing the thermal stability of the example battery cell 710, 720 as compared to the comparative battery cell 730, where the x-axis 700 represents temperature (° C.), and the y-axis 702 represents heat flow (HF). As illustrated, the example battery cells 710, 720, prepared in accordance with various aspects of the present disclosure, have improved thermal stability as compared to the comparative battery cell 730.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A positive electrode comprising:
   a positive electroactive material comprising a plurality of positive electroactive material particles and defining an electroactive material layer;
   a first lithium-containing coating disposed on one or more surfaces of the electroactive material layer, the first lithium-containing coating consisting essentially of a single continuous layer coating, the first lithium-containing coating having a thickness greater than or equal to about 0.2 nanometers to less than or equal to about 5 nanometers and an ionic conductivity greater than or equal to about $10^{-7}$ S/cm to less than or equal to about $10^{-3}$ S/cm, the first lithium-containing coating covering greater than or equal to about 30% to less than or equal to about 50% of a total surface area of the electroactive material layer; and
   a second lithium-containing coating surrounding at least one positive electroactive material particle of the plurality of positive electroactive material particles, the second lithium-containing coating having a thickness greater than or equal to about 0.2 nanometers to less than or equal to about 5 nanometers and covering greater than or equal to about 95% to less than or equal to about 100% of a total exposed surface area of the at least one positive electroactive material particle.

2. The positive electrode of claim 1, wherein the positive electroactive material is selected from the group consisting of: NCM 111, NCM 532, NCM 622, NCM 712, NCM 811, NCMA, NCA, LNMO, and combinations thereof, and
   the first and second lithium-containing coatings each comprise a lithium-containing material independently selected from the group consisting of: lithium phosphates, lithium alumina, lithium niobates, lithium silicates, lithium alumina fluoride, lithium fluoride, lithium phosphorus oxynitride (LiPON), and combinations thereof.

3. The positive electrode of claim 1, further comprising: greater than 0 wt. % to less than or equal to about 1 wt. % of an electrolyte additive, wherein the electrolyte additive is represented by $Li[B((OCH_2)_xCF_3)_4]$, where $1 \leq x \leq 6$.

4. The positive electrode of claim 1, further comprising an electrolyte additive, wherein the electrolyte additive comprises:

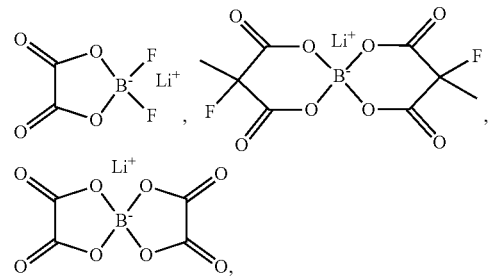

and combinations thereof.

5. The positive electrode of claim 3, further comprising:
   a passivation layer defined by the electrolyte additive disposed on one or more exposed surfaces of the first lithium-containing coating, the passivation layer having a thickness greater than or equal to about 0.2 nanometers to less than or equal to about 5 nanometers and covering greater than or equal to about 0.1% to less than or equal to about 50% of a total exposed surface area of the first lithium-containing coating.

6. The positive electrode of claim 1, wherein the first lithium-containing coating is prepared using one of an atomic layer deposition (ALD) process or a plasma enhanced atomic layer deposition (PEALD) process, wherein a coating precursor comprises one or more binary or ternary compounds, one or more lithium-source precursors, and one or more oxidizers.

7. The positive electrode of claim 6, wherein the one or more binary or ternary compounds are selected from the group consisting of:
   lithium phosphates, lithium alumina, lithium niobates, lithium silicates, lithium alumina fluoride, lithium fluoride, lithium phosphorus oxynitride (LiPON), and combinations thereof;
   the one or more lithium-source precursors are selected from the group consisting of: lithium tert-butoxide (LiOtBu), lithium bis(trimethylsilyl)amide (LiHMDS), lithium 2,2,6,6-tetramethyl-3,5-heptanedionate (Lithd), lithium amides, and combinations thereof; and
   the one or more oxidizers are selected from the group consisting of: trimethyl phosphate ($(MeO)_3PO$) (TMPO), $H_2O$, $TiF_4$, $NH_4F$, $O_3$, $O_2$, and combinations thereof.

8. The positive electrode of claim 7, wherein the atomic layer deposition (ALD) process or the plasma enhanced atomic layer deposition (PEALD) process has a deposition temperature of greater than or equal to about 100° C. to less than or equal to about 250° C.

9. The positive electrode of claim 6, wherein the second lithium-containing coating is prepared using one of an atomic layer deposition (ALD) process and a plasma enhanced atomic layer deposition (PEALD) process, wherein a coating precursor comprises one or more binary or ternary compounds, one or more lithium-source precursors, and one or more oxidizers.

10. A positive electrode comprising:
    a plurality of positive electroactive material particles defining an electroactive material layer;
    a first lithium-containing coating surrounding at least one positive electroactive material particle of the plurality of positive electroactive material particles, the at least one lithium-containing coating having a thickness greater than or equal to about 0.2 nanometers to less than or equal to about 5 nanometers and an ionic conductivity greater than or equal to about $10^{-7}$ S/cm to less than or equal to about $10^{-3}$ S/cm; and a second lithium-containing coating disposed on the electroactive material layer, the second lithium-containing coating consisting essentially of a single continuous layer coating, the second lithium-containing coating having a thickness greater than or equal to about 0.2 nanometers to less than or equal to about 5 nanometers and covering greater than or equal to about 30% to less than or equal to about 50% of a total exposed surface area of the electroactive material layer.

11. The positive electrode of claim 10, wherein the positive electroactive material is selected from the group consisting of: NCM 111, NCM 532, NCM 622, NCM 712, NCM 811, NCMA, NCA, LNMO, and combinations thereof, and wherein the first and second lithium-containing coatings each comprise a lithium-containing material independently selected from the group consisting of: lithium phosphates, lithium alumina, lithium niobates, lithium silicates, lithium alumina fluoride, lithium fluoride, lithium phosphorus oxynitride (LiPON), and combinations thereof.

12. The positive electrode of claim 10, wherein the first lithium-containing coating covers greater than or equal to about 95% to less than or equal to about 100% of a total exposed surface area of the at least one positive electroactive material particle.

13. The positive electrode of claim 10, further comprising: greater than 0 wt. % to less than or equal to about 1 wt. % of an electrolyte additive, wherein the electrolyte additive is represented by $Li[B((OCH_2)_xCF_3)_4]$, where $1 \leq x \leq 6$.

14. The positive electrode of claim 13, further comprising:

a passivation layer defined by the electrolyte additive disposed on one or more exposed surfaces of the first lithium-containing coating, the passivation layer having a thickness greater than or equal to about 0.2 nanometers to less than or equal to about 5 nanometers and covering greater than or equal to about 30% to less than or equal to about 50% of a total exposed surface area of the first lithium-containing coating.

15. The positive electrode of claim 10, wherein the first lithium-containing coating is prepared using one of an atomic layer deposition (ALD) process and a plasma enhanced atomic layer deposition (PEALD) process, wherein a coating precursor comprises:

one or more binary or ternary compounds selected from the group consisting of: lithium phosphates, lithium alumina, lithium niobates, lithium silicates, lithium alumina fluoride, lithium fluoride, lithium phosphorus oxynitride (LiPON), and combinations thereof;

one or more lithium-source precursors selected from the group consisting of: lithium tert-butoxide (LiOtBu), lithium bis(trimethylsilyl)amid e (LiHMDS), lithium 2,2,6,6-tetramethyl-3,5-heptanedionate (Lithd), lithium amides, and combinations thereof; and one or more oxidizers selected from the group consisting of: trimethyl phosphate $((MeO)_3PO)$ (TMPO), $H_2O$, $TiF_4$, $NH_4F$, $O_3$, $O_2$, and combinations thereof.

16. The positive electrode of claim 15, wherein the atomic layer deposition (ALD) process or the plasma enhanced atomic layer deposition (PEALD) process has a deposition temperature of greater than or equal to about 100° C. to less than or equal to about 250° C.

17. A positive electrode comprising:

a plurality of positive electroactive material particles defining an electroactive material layer;

at least one first lithium-containing coating surrounding at least one positive electroactive material particle of the plurality of positive electroactive material particles, the at least one first lithium-containing coating covering greater than or equal to about 95% to less than or equal to about 100% of a total exposed surface area of the at least one positive electroactive material particle; and a second lithium-containing coating disposed on one or more surfaces of the electroactive material layer, the second lithium-containing coating consisting essentially of a single continuous layer coating, the second lithium-containing coating covering greater than or equal to about 30% to less than or equal to about 50% of a total exposed surface area of the electroactive material layer, the at least one first lithium-containing coating and the second lithium-containing coating each comprising a lithium-containing material independently selected from the group consisting of: lithium phosphates, lithium alumina, lithium niobates, lithium silicates, lithium alumina fluoride, lithium fluoride, lithium phosphorus oxynitride (LiPON), and combinations thereof.

* * * * *